(12) United States Patent
Aufmkolk

(10) Patent No.: US 9,669,757 B2
(45) Date of Patent: Jun. 6, 2017

(54) MOTOR VEHICLE INTERIOR TRIM PART WITH OLED

(71) Applicant: Faurecia Innenraum Systeme GmbH, Hagenbach (DE)

(72) Inventor: Rudolf Aufmkolk, Riedstadt (DE)

(73) Assignee: FAURECIA INNENRAUM SYSTEME GMBH, Hagenbach (DE)

( * ) Notice: Subject to any disclaimer, the term of this patent is extended or adjusted under 35 U.S.C. 154(b) by 150 days.

(21) Appl. No.: 14/623,930

(22) Filed: Feb. 17, 2015

(65) Prior Publication Data
US 2015/0298608 A1    Oct. 22, 2015

(30) Foreign Application Priority Data

Mar. 21, 2014 (DE) .................. 10 2014 103 938

(51) Int. Cl.
| | | |
|---|---|---|
| F21S 9/03 | (2006.01) | |
| B60Q 3/04 | (2006.01) | |
| B60K 37/00 | (2006.01) | |
| B60R 13/02 | (2006.01) | |
| B32B 37/00 | (2006.01) | |
| B60Q 3/74 | (2017.01) | |
| B60Q 3/54 | (2017.01) | |
| F21Y 105/00 | (2016.01) | |
| F21Y 115/15 | (2016.01) | |

(52) U.S. Cl.
CPC .............. *B60Q 3/04* (2013.01); *B32B 37/00* (2013.01); *B60K 37/00* (2013.01); *B60Q 3/54* (2017.02); *B60Q 3/745* (2017.02); *B60R 13/02* (2013.01); *F21S 9/037* (2013.01); *B32B 2307/20* (2013.01); *B60Q 2500/10* (2013.01); *B60R 2013/0287* (2013.01); *F21Y 2105/00* (2013.01); *F21Y 2115/15* (2016.08)

(58) Field of Classification Search
CPC ..... F21S 19/005; F21S 9/037; F21Y 2115/15; H01L 27/3204; H01L 27/3227
USPC .......................................................... 362/489
See application file for complete search history.

(56) References Cited

U.S. PATENT DOCUMENTS

| | | | |
|---|---|---|---|
| 2005/0146874 A1* | 7/2005 | Cech ....................... | F21S 8/081 362/253 |
| 2010/0195337 A1 | 8/2010 | Heite | |
| 2010/0237374 A1* | 9/2010 | Chu ..................... | H01L 27/3227 257/98 |

(Continued)

FOREIGN PATENT DOCUMENTS

| | | |
|---|---|---|
| DE | 10341253 A1 | 4/2005 |
| DE | 202005014791 U1 | 12/2005 |

(Continued)

OTHER PUBLICATIONS

Office Action for corresponding DE Application No. 10 2014 103 938.6, dated Dec. 15, 2014.

*Primary Examiner* — Julie Bannan
(74) *Attorney, Agent, or Firm* — Matthew B. Dernier, Esq.

(57) ABSTRACT

A motor vehicle interior trim part for a motor vehicle interior includes at least one integrated organic light-emitting diode OLED, where the motor vehicle interior trim part has a decorative layer, where the decorative layer has a surface structure, and where the visible side of the OLED directly adjacent to the vehicle interior has the same surface structure as the decorative layer.

10 Claims, 4 Drawing Sheets

(56) References Cited

U.S. PATENT DOCUMENTS

| | | | |
|---|---|---|---|
| 2011/0310597 A1* | 12/2011 | Lu .......................... | F24J 2/085 362/183 |
| 2012/0120643 A1* | 5/2012 | Meng ..................... | B82Y 10/00 362/183 |
| 2012/0162972 A1* | 6/2012 | Visser ..................... | F21S 8/08 362/184 |
| 2012/0313113 A1* | 12/2012 | Chen ................... | H01L 27/3227 257/84 |
| 2012/0327660 A1* | 12/2012 | Lin ........................ | F21S 9/037 362/253 |
| 2013/0301287 A1 | 11/2013 | Schlemmer | |
| 2014/0376215 A1* | 12/2014 | Lin ........................ | F21S 9/037 362/183 |

FOREIGN PATENT DOCUMENTS

| | | |
|---|---|---|
| DE | 102009000605 A1 | 8/2010 |
| DE | 102010043960 A1 | 5/2012 |
| WO | 2008148199 A1 | 12/2008 |
| WO | 2009030701 A1 | 3/2009 |

* cited by examiner

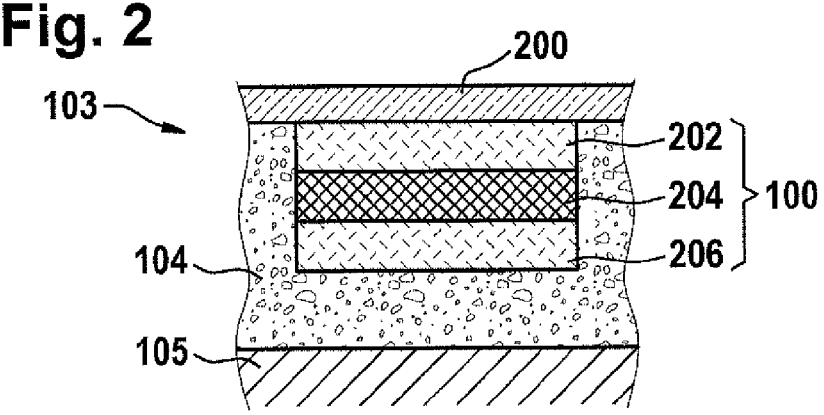
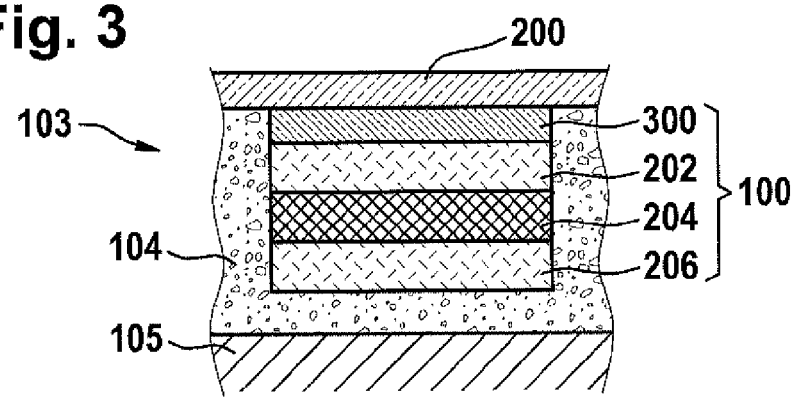
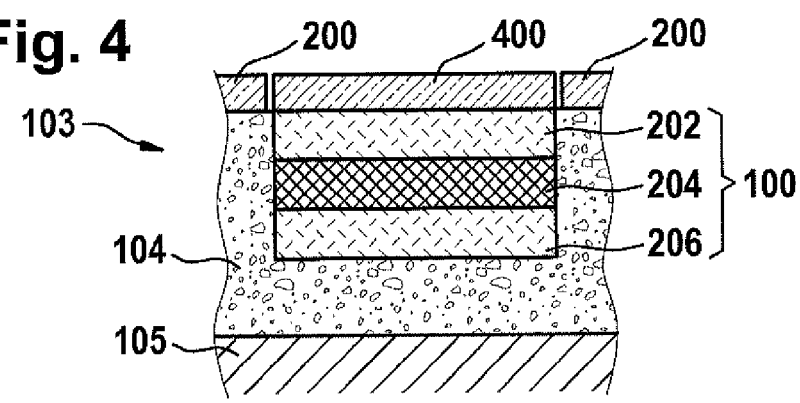
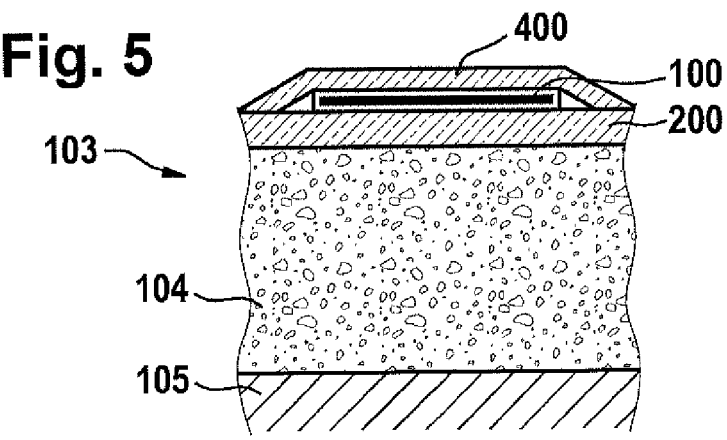

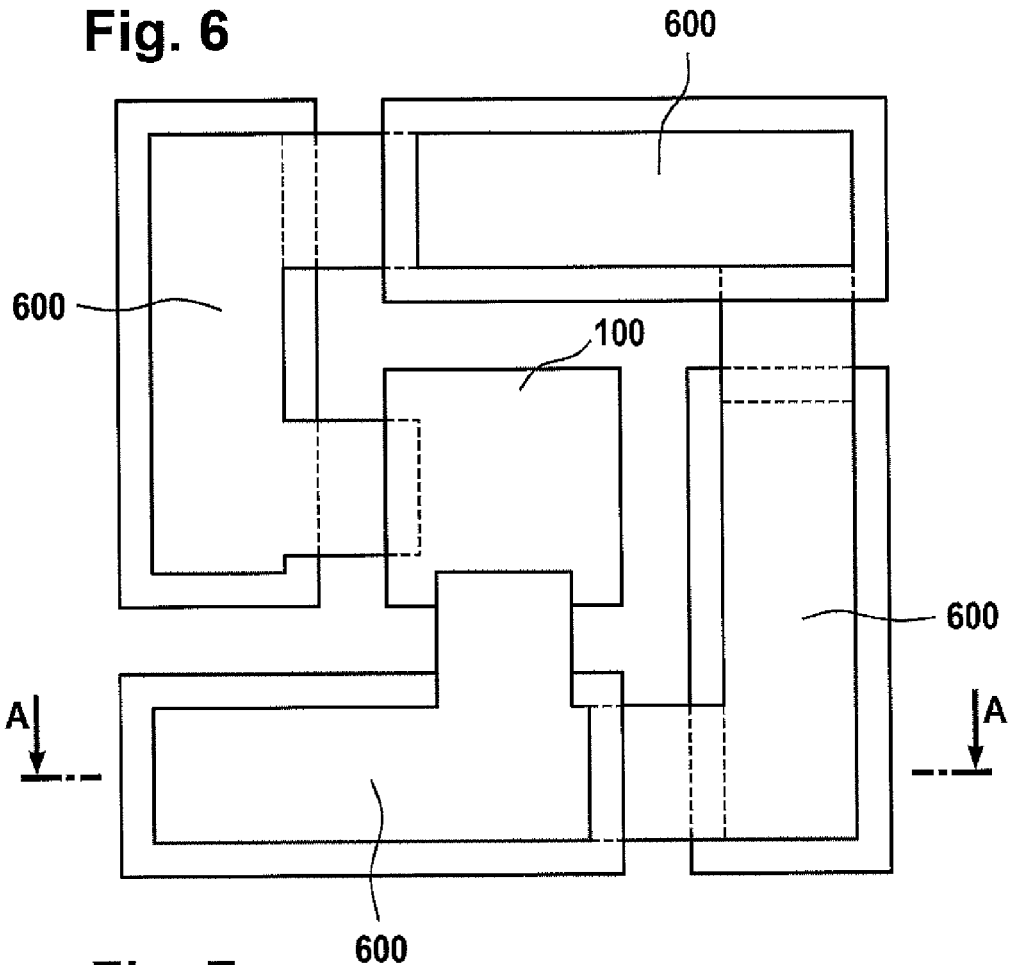
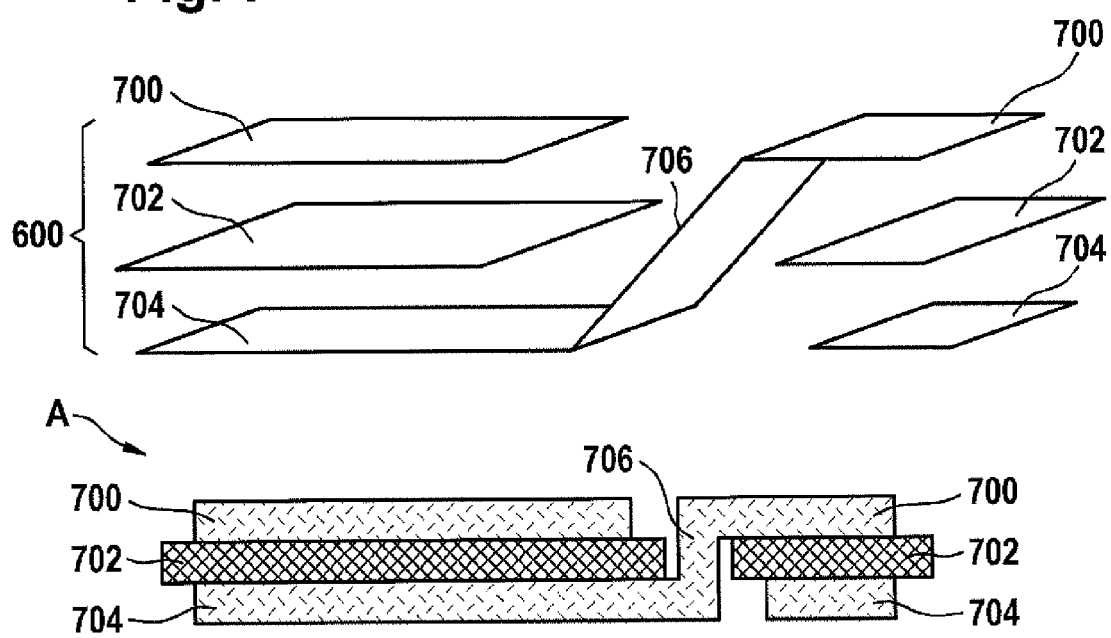

MOTOR VEHICLE INTERIOR TRIM PART WITH OLED

BACKGROUND

The invention relates to a motor vehicle interior trim part for a motor vehicle interior, comprising at least one integrated organic light-emitting diode (OLED), and also to a method for producing a motor vehicle interior trim part.

Motor vehicle interior trim parts, such as instrument panels, armrests, door trims and rear window shelves, are known from the prior art. These usually have a decorative layer with a decorative material, whereby the motor vehicle interior trim part is provided with a certain visual and haptic impression.

By way of example, WO 2008/148199 A1 discloses a motor vehicle interior trim part comprising an integrated organic light-emitting diode (OLED).

SUMMARY

The object of the invention is to provide an improved motor vehicle interior trim part and a corresponding method for producing such a motor vehicle interior trim part.

The objects forming the basis of the invention are achieved by the features of the independent patent claims. Preferred embodiments of the invention are specified in the dependent patent claims.

What is described is a motor vehicle interior trim part for a motor vehicle interior, comprising an integrated organic light-emitting diode OLED, wherein the motor vehicle interior trim part has a decorative layer, wherein the decorative layer has a surface structure, wherein the visible side of the OLED directly adjacent to the vehicle interior has the same surface structure as the decoration.

It should be mentioned at this juncture that said motor vehicle interior trim can be used for any types of motor vehicles. A motor vehicle is any vehicle driven by engine power and not mounted on rails. Besides normal passenger cars, this also includes lorries and motorbikes.

Within the scope of the description an organic light-emitting diode (OLED) is understood to mean a luminescent thin-film component formed from organic semiconducting materials, which, besides a cathode, also has an anode and, between the cathode and anode, an organic emitter layer.

By way of example, the decoration and the visible side of the OLED adjacent to the vehicle interior are identical in terms of haptics. This could have the advantage that an OLED is integrated into such a motor vehicle interior trim part without being noticed by a user of the vehicle, in particular in the un-operated, that is to say switched off and de-energised state. It is thus possible to integrate an OLED into a motor vehicle and for this to be noticed only under certain operating conditions, wherein, however, in all other cases the presence of the OLED preferably goes primarily unnoticed by a user of the vehicle. Such an OLED can be inserted without difficulty into the overall appearance of the motor vehicle.

By way of example, it is conceivable for the OLED to be operated only in certain cases. It is conceivable for example that the OLED (or a number of these OLEDs) is used in cases directly after unlocking of the motor vehicle in order to light up the motor vehicle interior sufficiently. For example when it is dark, a user of the motor vehicle can therefore enter the vehicle more easily.

A further special case for the commissioning and use of the OLED(s) could be substantiated in the design of the vehicle interior. By way of example, it could be desirable to provide the motor vehicle interior with a certain design look by a certain form of the OLEDs and the colour of the light emission of the OLEDs during the day. However, since the motor vehicle interior is usually dark anyway at night and such design touches are not perceived, the OLED could therefore be in operation merely during daytime operation, and the presence of the OLED would not be noticed at all during operation of the motor vehicle in darkness. This could therefore be important in particular since potential dazzling of a user of the motor vehicle could be avoided. Nevertheless, it is also true here that, when OLEDs are switched off, a user in principle cannot feel the presence of an OLED on the motor vehicle interior trim part.

A further special case of operation of an OLED on a motor vehicle interior trim part could be used for the display of warnings in the motor vehicle. It is thus usually assumed that the warning does not have to be displayed during normal operation of the motor vehicle. Only when the warnings are necessary does the user become aware of the presence of the OLED. On the whole, the motor vehicle interior trim part can be formed in conventional designs that fit in well in the overall appearance of the motor vehicle interior and can even enable the output of warnings at particularly prominent points in the motor vehicle, for example on the instrument panel directly below eye level of the motor vehicle occupant. Nevertheless, the presence of the OLEDs will not be noticed during normal operation. A warning for example could be "airbag fault" or "fasten belt".

In accordance with an embodiment of the invention the decorative layer is coloured, wherein the visible side of the OLED directly adjacent to the vehicle interior has the same colour as the decoration in the case that the OLED is out of operation. The outwardly visible surface of the OLED therefore, besides a haptic similarity to the decorative layer, also has a visual similarity to the decorative layer in terms of colour.

In accordance with an embodiment of the invention the visible side of the OLED directly adjacent to the vehicle interior has a transparent substrate material, wherein the substrate material comprises a polymer. The visible side of the OLED directly adjacent to the vehicle interior could therefore be formed by the substrate material of the OLED itself. Here, further cover layers above the substrate material could be omitted in particular, such that the overall production costs of the motor vehicle interior trim part comprising OLED can be minimised.

In accordance with an alternative embodiment the OLED has a transparent substrate material, wherein a transparent protective layer is arranged on the visible side of the substrate material, wherein the visible layer of the OLED directly adjacent to the vehicle interior is provided by the protective layer, wherein the protective layer comprises a polymer. This could have the advantage that the structure of OLEDs can be formed in the conventional manner. However, the substrate layer of the OLED, which is transparent anyway, is only provided additionally with a transparent protective layer, which can be adapted accordingly to the haptic and visual appearance of the decorative layer itself.

In accordance with an embodiment of the invention the polymer comprises polyester, in particular polyethylene terephthalate (PET) or polyethylene naphthalate (PEN) or polycarbonate (PC) or polyvinyl chloride (PVC) or polyetherimide (PEI) or polyimide (PI).

In accordance with an embodiment of the invention the surface structure comprises a grain and/or a surface roughness.

In accordance with an embodiment of the invention the motor vehicle interior trim part is an instrument panel, wherein the OLED is arranged between the contact region of the instrument panel with the windscreen of the motor vehicle and the defroster vent associated with the windscreen.

This could have the advantage that the OLED is therefore accommodated in a region of the instrument panel in which the part of the windscreen located thereabove is blackened in conventional motor vehicles. This region therefore is not generally used in conventional motor vehicles. However, due to the provision of the OLED in this region, it is possible to accommodate in the motor vehicle warning elements that are protected against external weather influences. These are again imperceptible to a vehicle occupant during normal operation of the motor vehicle, even in the case of haptic inspection, due to the adaptation of the surface structure. Again, only in a special case can the OLED be put into operation. By way of example, a corresponding special case could include an externally visible delivery of a warning signal, for example due to the triggering of an alarm system. In this case the blackening of the windscreen would have to be cancelled for this purpose.

In accordance with a further embodiment of the invention the OLED is arranged on an airbag cover of the motor vehicle interior trim part, wherein the OLED is designed to display an operating state of the airbag. However, such an operating state is then only displayed when it deviates from the case of normal operation. In other words, a display by means of the OLED is then preferably only provided in the case of a fault of the airbag or a conscious deactivation by a vehicle occupant. By contrast, in the normal operating circumstance of the airbag there is no activation of the OLED, and therefore a vehicle occupant does not feel disturbed by the presence of the OLED on account of the optimal insertion of said OLED into the appearance of the surface of the motor vehicle interior trim parts.

In accordance with an embodiment of the invention the motor vehicle interior trim part further comprises a number of organic solar cells, wherein the OLED has an anode and cathode arranged above one another along an axis. The emitter layer is usually located between anode and cathode. The OLED is surrounded by the organic solar cells in a plane perpendicular to this axis, wherein the organic solar cells are designed to supply energy to the OLED. Here, the visible side of the organic solar cells is preferably formed such that it has the same surface structure and/or colour as the decorative layer. It could therefore be possible to supply energy to the OLED self-sufficiently, without the need for complex wiring or cabling in the motor vehicle for this purpose. Nevertheless, in this case also the overall optical appearance of the motor vehicle interior trim part must not suffer as a result of the fact that organic solar cells are now additionally also provided in order to supply energy to the OLED.

It should be noted at this juncture that organic light-emitting diodes and/or organic solar cells can therefore be used within the scope of the entire description since these have a mechanical flexibility that can be adapted to the mechanical surface properties of the motor vehicle interior trim part. Instead of providing a stiff and rigid LED or a stiff and rigid solar module, an OLED or an organic solar cell is thus proposed, which on the one hand when exposed to mechanical pressure can yield in a flexible manner to this pressure and on the other hand can easily followed the shaping of the instrument panel, which may be curved. The OLED and/or the organics oversell can therefore be used also with curved surfaces of the motor vehicle interior trim apart.

In accordance with an embodiment of the invention the organic solar cells are connected electrically in series, whereby they form a chain of solar cells. The anode of the first solar cell in the chain is electrically connected to the anode of the OLED, and the cathode of the last solar cell in the chain is electrically connected to the cathode of the OLED. Thus, due to the series connection of the solar cells, the operating voltage necessary for operation of the OLED could be obtained in a versatile and space-saving manner. The solar cells preferably surround the OLED symmetrically, for example by arrangement of the solar cells over the limbs of a rectangle around the OLED or over the circular outline of a circle around the OLED. The solar cells are preferably also the only energy source for the OLED.

For example, the anodes of the solar cells could be arranged in a first plane, and the cathodes of the solar cell could be arranged in a second plane. It could therefore be possible to produce at least the solar cells and possibly also solar cells in combination with OLED in a printing method, for example an inkjet printing method. In spite of the series connection of the solar cells, it is possible due to the layered structure to enable a connection of the individual cells and also a connection to the OLED by printing the individual electric components above one another in different planes.

In accordance with a further embodiment of the invention the OLED and/or the solar cell is/are printed or adhesively bonded onto the decorative layer of the motor vehicle interior trim part. However, it is also possible for the OLED and/or the solar cells to be integrated into the motor vehicle interior trim part and for the decorative layer, as already described above, to jointly cover the OLED and/or solar cell and the motor vehicle interior trim part. In this case a joint lamination of foamed substrates of the motor vehicle interior trim part and OLED and/or solar cells would be difficult or even impossible, but instead the visible side of the OLED and/or of the solar cells directly adjacent to the motor vehicle interior could also be provided in a separate step with a material corresponding haptically and/or visually to the decorative layer. Separately herefrom, a conventional lamination of the motor vehicle interior trim part could be performed with the exception of the regions of the OLED and/or solar cells.

In a further aspect the invention relates to a method for producing a motor vehicle interior trim part for a motor vehicle interior of a motor vehicle, wherein the method comprises the following steps:

providing a substrate that optionally can be foamed applying an organic light-emitting diode OLED to the surface of the substrate, laminating the substrate comprising the OLED with a decorative layer, wherein the visible side of the OLED directly adjacent to the vehicle interior is formed by the decorative layer on account of the lamination.

In a further aspect the invention relates to a method for producing a motor vehicle interior trim part for a motor vehicle interior of a motor vehicle, wherein the method comprises the following steps:

providing a substrate, applying an organic light-emitting diode OLED to the surface of the substrate, laminating the substrate comprising the OLED with a decorative layer, wherein the decorative layer has a recess in the region of the OLED, wherein the decorative layer has a surface structure, wherein the visible side of the OLED directly adjacent to the vehicle interior has the same surface structure as the decorative layer.

In a further aspect the invention relates to a method for producing a motor vehicle interior trim part for a motor vehicle interior of a motor vehicle, wherein the method comprises the following steps:

providing a substrate laminated with a decorative layer, wherein the decorative layer has a surface structure, printing or adhesively bonding at least one organic light-emitting diode OLED onto the decorative layer, wherein the visible side of the OLED directly adjacent to the vehicle interior has the same surface structure as the decorative layer.

It should be noted at this juncture that the described method steps can also be applied analogously for the solar cells.

BRIEF DESCRIPTION OF THE DRAWING

Preferred embodiments of the invention will be explained in greater detail hereinafter on the basis of the drawings. In the drawings:

FIG. 2 shows a cross-sectional view through a motor vehicle interior trim part,

FIG. 3 shows a cross-sectional view through a motor vehicle interior trim part,

FIG. 4 shows a cross-sectional view through a motor vehicle interior trim part,

FIG. 5 shows a further cross-sectional view through a motor vehicle interior trim part, FIG. 6 shows a plan view of a combination of OLED and organic light-emitting diodes, FIG. 7 shows a sectional view A-A through one of the organic solar cells of FIG. 6.

DETAILED DESCRIPTION

Hereinafter, similar elements will be denoted by like reference signs.

Figure 1:
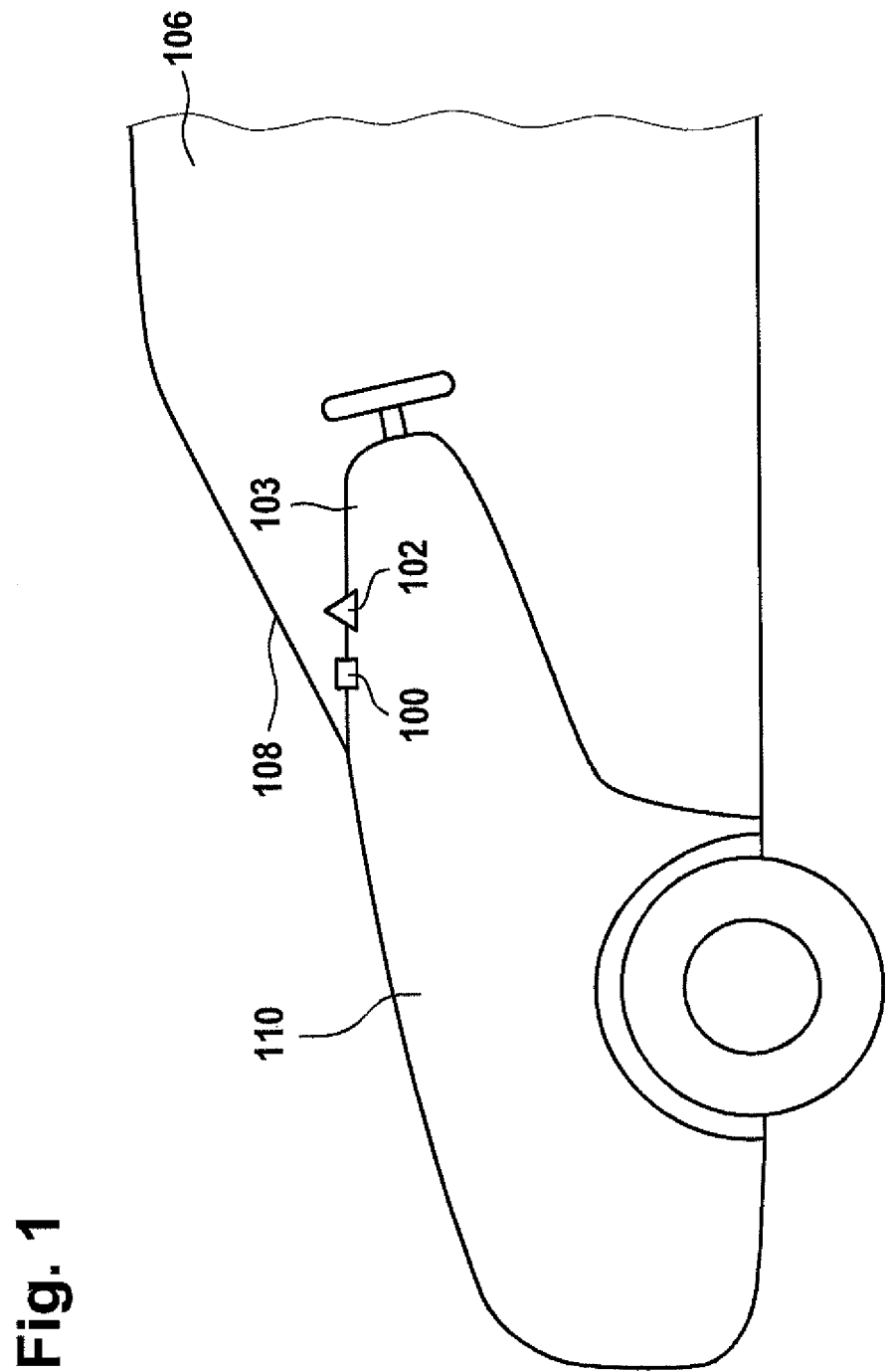
FIG. 1 shows a cross-sectional view through the interior of a motor vehicle.

FIG. 1 shows a cross-sectional view through a motor vehicle, wherein merely the front part of the motor vehicle 110 is shown here. The motor vehicle 110 has an interior 106, which is delimited in the front region of the motor vehicle by an instrument panel 103 and by the windscreen 108. In the region of the defrosted vent 102, which is intended to transport air onto the windscreen at 108, there is located between the windscreen 108 and the defroster vent 102 an organic light-emitting diode OLED 100. This light-emitting diode has a haptic surface structure on the visible side thereof directly adjacent to the vehicle interior 106 that is the same haptic surface structure as that of the decorative layer of the instrument panel 103. This can be achieved by various measures, as will be explained in greater detail hereinafter in FIGS. 2 to 5.

Here, FIG. 2 shows a cross-sectional view through the instrument panel 103, which, besides a substrate 105, also has a foam layer 104. The OLED 100 is embedded in the foam layer 104.

A common decorative layer 200 covers both the foam layer 104, that is to say the foamed region of the instrument panel 103, and the OLED with electrodes 202 and 206 thereof and the emitter layer 204 arranged therebetween. Here, one precondition is that the decorative layer 200 is transparent to the light emitted in the emitter layer. Here, the transparency can be provided for a predefined wavelength range of the emitted light and preferably lies in the range between 60 and 100%.

In the alternative embodiment, as is shown in FIG. 3, the uppermost electrode 202 of the OLED is covered by a transparent substrate 300. Here, this substrate 300 is used to encapsulate the OLED in order to thus protect the layers 202, 204 and 206 located therebeneath against ambient influences. In addition, the substrate could ensure, in the event of a lamination process of foam layer 104 and OLED 100, that the OLED 100 does not sustain any damage during the process of lamination with the decorative layer 200.

In FIG. 4 the OLED 100 is also integrated into the foam layer 104. However, the decorative layer 200 of the instrument panel now also has a recess, such that in this case the decorative layer 200 does not also cover the surface and visible side of the OLED 100. Instead, the OLED has its own visible side, which is directly adjacent to the vehicle interior. This visible side has a protective layer 400, which, on the side thereof directly adjacent to the vehicle interior, has the same surface structure as the decorative layer 200 arranged therebeside. Here, by way of example, the motor vehicle interior trim part 104 could be provided with the decorative layer 200 in a production process, and the OLED 100 with the layered structure and the protective layer 400 thereof could be inserted in a subsequent process step into a recess of the motor vehicle interior trim part 104 provided for this purpose.

FIG. 5 shows a variant of a motor vehicle interior trim part 104 with decorative layer 200, in which the OLED 100 with the protective layer 400 thereof has been applied onto the decorative layer 200. By way of example, the OLED 100 could be adhesively bonded or printed onto the decorative layer 200.

The protective layer 400 preferably overlaps the OLED 100 laterally, such that a soft transition between decorative layer 200 and the region of the OLED 100 is created. Since OLEDs can usually be produced so as to be very thin, the presence of the OLED on the motor vehicle interior trim part is hardly noticeable due to the selection of such a transition between decorative layer and the region occupied by the OLED. Due to the preferably thin embodiment of OLEDs, an observer of the motor vehicle interior trim part is therefore only able to make out the presence of the OLED with difficulty, if at all, in the region of the overlap, due to the lateral protrusion of the protective layer 400 from the OLED 100 and therefore due to said overlap of decorative layer 200 and protective layer laterally of the OLED.

FIG. 6 shows a view of a combination of an OLED 100 with a plurality of organic solar cells 600. The solar cells 600 here surround the OLED 100 symmetrically over the edges of a rectangle or a square. The reason lies in the successive arrangement of the shown organic solar cells 600, which is somewhat clearer in FIG. 7.

FIG. 7 shows a cross-sectional view A through two of the solar cells 600. The solar cells again consist of electrodes 700 and 704 and therebetween an organic material 702, which serves to provide electric hole pairs in the event of irradiation with light. The electrodes 700 and 704 and also the active layer 702 are stacked above one another in three different layers. In order to now electrically connect two adjacent solar cells to one another in series, an anode of one of the solar cells is in each case electrically connected to a cathode of one of the solar cells. In the sectional view A of FIG. 7 this would be, for example, an electrical connection of the anode 700 to the cathode 704 via an electrical connection element 706. Due to said layered structure, it is possible, for example in an inkjet printing method, to apply the individual layers to a substrate, for example to the decorative layer of a motor vehicle interior trim part.

The anode 700 of the first solar cell in the chain (in FIG. 6 the solar cell in the bottom left-hand corner) is electrically connected to the anode of the OLED 100, and the cathode of the solar cell 600 (in FIG. 6 in the upper left-hand corner) is electrically connected to the cathode of the OLED 100. On the whole, this thus provides a self-sufficient and compact OLED solar cell module that can supply itself with power and that, on account of the selected layered structure both of OLED and of the solar cells, can be printed onto a motor vehicle interior trim part, in particular onto the decorative layer thereof.

Figure 8:
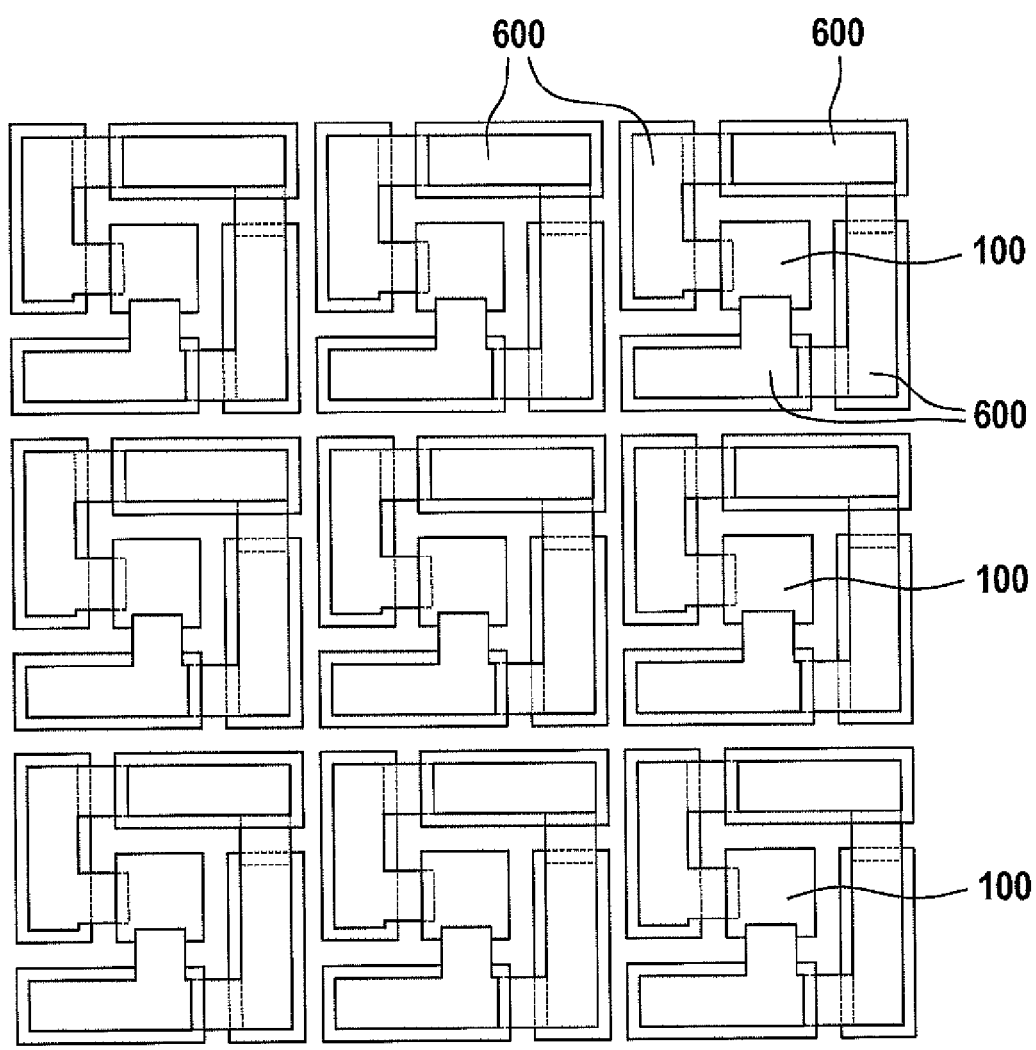
FIG. 8 shows a view from above of an accumulation of various organic light-emitting diodes, surrounded by respective organic solar cells.

The corresponding result is shown in FIG. 8, wherein here a plurality of combined OLED solar cell modules are provided side by side. If these are joined together in the form of letters, lettering can thus be provided on the decorative layer of a motor vehicle interior trim part.

As already mentioned above, however, it is also possible for both OLEDs and solar cells to be integrated in motor vehicle interior trim parts and to have the same decorative layer as the rest of the surface region of the motor vehicle interior trim part. In this regard the teaching of FIGS. 2 to 5 can be transferred analogously to the structure and the integration of solar cells in the motor vehicle interior trim part 104.

LIST OF REFERENCE SIGNS

100 OLED
102 defroster vent
103 instrument panel
104 motor vehicle interior trim part
105 substrate
106 motor vehicle interior
108 windscreen
110 motor vehicle
200 decorative layer
202 electrode
204 emitter layer
206 electrode
300 substrate
400 visible side of the OLED
600 organic solar cells
700 anode
702 active layer
704 cathode
706 connection element

The invention claimed is:

1. An apparatus, comprising:
   at least one integrated organic light-emitting diode OLED (100) having an anode and cathode arranged above one another along an axis, and having a visible side, and
   a number of organic solar cells (600) arranged in a plane perpendicular to the axis, wherein the organic solar cells (600) supply energy to the OLED (100),
   wherein the OLED (100) is surrounded by the organic solar cells (600), and
   wherein the organic solar cells (600) are connected electrically in series, forming a chain of solar cells (600), such that an anode (700) of a first of the organic solar cells in the chain is electrically connected to an anode of the OLED (100), and a cathode (700) of a last of the organic solar cells in the chain is electrically connected to the cathode of the OLED.

2. The apparatus according to claim 1, wherein:
   the OLED (100) and the organic solar cells (600) are integrated within a motor vehicle interior trim part (103) of an instrument panel of a motor vehicle,
   the motor vehicle trim part includes a decorative layer (200) having a surface structure, and wherein the visible side of the OLED (100) shares the surface structure of the decorative layer (200), and
   the decorative layer (200) is coloured, and the visible side of the OLED (100) has the same colour as the decorative layer (200) in the case that the OLED (100) is out of operation.

3. The apparatus according to claim 1, wherein the visible side of the OLED (100) has a transparent substrate material (300), wherein the substrate material (300) comprises a polymer.

4. The apparatus according to claim 1, wherein the OLED (100) has a transparent substrate material (300), wherein a transparent protective layer (400) is arranged on the visible side of the substrate material (300), wherein the visible layer of the OLED (100) is provided by the protective layer (400), and wherein the protective layer (400) comprises a polymer.

5. The apparatus according to claim 1, wherein the OLED (100) and the organic solar cells (600) are integrated within a motor vehicle interior trim part (103) of an instrument panel of a motor vehicle, wherein the OLED (100) is arranged between a contact region of the instrument panel and a windscreen (108) of the motor vehicle and forward of a defroster vent (102) associated with the windscreen (108).

6. The apparatus according to claim 1, wherein:
   the OLED (100) and the organic solar cells (600) are integrated within a motor vehicle interior trim part (103) of an instrument panel of a motor vehicle, and
   the motor vehicle interior trim part (103) includes a decorative layer (200) having a surface structure, and wherein the visible side of the OLED (100) shares the surface structure of the decorative layer (200).

7. The apparatus according to claim 6, wherein the visible side of the OLED (100) is of a same colour as the decorative layer (200).

8. The apparatus according to claim 1, wherein anodes (700) of the solar cells (600) are arranged in a first plane, and cathodes (704) of the solar cells (600) are arranged in a second plane.

9. The apparatus according to claim 6, wherein the OLED (100) and/or the solar cells is/are printed or adhesively bonded onto the decorative layer (200).

10. The apparatus according to claim 6, wherein a material of the decorative layer corresponds to a material of the visible side of the OLED (100).

* * * * *